United States Patent [19]

Huis In't Veld et al.

[11] Patent Number: 5,160,617
[45] Date of Patent: Nov. 3, 1992

[54] POROUS INORGANIC COMPOSITE SEMIPERMEABLE MEMBRANE AND A METHOD OF PREPARATION

[75] Inventors: Marcel B. J. Huis In't Veld; Robert J. R. Uhlhorn; Yve-Sheng Lin; Klaas Keizer; Anthonie J. Burggraaf, all of Ae Enschede, Netherlands

[73] Assignee: Aluminum Company of America, Pittsburgh, Pa.

[21] Appl. No.: 683,079

[22] Filed: Apr. 10, 1991

[30] Foreign Application Priority Data

Apr. 12, 1990 [FR] France .................. 90 04755

[51] Int. Cl.$^5$ ............................................ B01D 71/02
[52] U.S. Cl. .................. 210/490; 210/500.25
[58] Field of Search ............ 210/490, 500.25, 500.26, 210/510.11, 496; 427/244, 245, 246

[56] References Cited

U.S. PATENT DOCUMENTS

| | | | |
|---|---|---|---|
| 3,895,963 | 7/1975 | McGowen et al. | 264/63 X |
| 4,562,021 | 12/1985 | Alary et al. | 264/43 |
| 4,711,719 | 12/1987 | Leenaars et al. | 210/500.26 |
| 4,981,590 | 1/1991 | Veen et al. | 210/500.25 X |

FOREIGN PATENT DOCUMENTS

| | | |
|---|---|---|
| 331459 | 9/1989 | European Pat. Off. |
| 2018179 | 5/1970 | France . |
| 2575396 | 12/1984 | France . |

OTHER PUBLICATIONS

A.F.M. Leenaars et al., "The Preparation and Characterization of Alumina Membranes with Ultra-Fine Pores", Journal of Materials Science, vol. 19, (1984), pp. 1077-1088.

Primary Examiner—Frank Spear
Attorney, Agent, or Firm—Sughrue, Mion, Zinn Macpeak & Seas

[57] ABSTRACT

A porous inorganic composite semipermeable membrane provided with a support and a separating layer which has pores with an average diameter less than 1 μm and which comprises at least two refractory metal oxides, wherein:

the separating layer is composed of grains of a first oxide phase and grains of at least one second oxide which is dispersed over and chemically bonded to the first oxide phase, so as to constitute at least a portion of the free surface of the grains of the first oxide phase and at least a portion of the grain boundaries between the grains of the first oxide phase;

the first oxide phase and the second oxide are chosen so that the second oxide slows down diffusion both at the surface and at the grain boundary of the first oxide phase and has low solubility in the first oxide phase; and the volume of the second oxide lies in the range of 0.1% to 25% of the volume of the first oxide phase.

6 Claims, 5 Drawing Sheets

POROUS INORGANIC COMPOSITE SEMIPERMEABLE MEMBRANE AND A METHOD OF PREPARATION

The present invention relates to a porous inorganic composite semipermeable membrane comprising a macroporous support and a thin separating layer which is composed of a plurality of inorganic oxides and has an average pore diameter of less than one micron.

Composite membranes are composed of a plurality of superposed layers having different pore sizes, where the separating layer is the layer with the smallest pore size and is situated at the surface of the membrane.

BACKGROUND OF THE INVENTION

Composite membranes are well known.

For example, U.S. Pat. Nos. 4,711,719 and 4,562,021 describe methods of manufacturing membranes with separating layers made of $Al_2O_3$. This involves preparing a sol containing boehmite (AlOOH) particles of size lying in the range of 3 nm to 2 $\mu$m and which are in suspension in a liquid phase comprising water, an acid such as $HNO_3$ or $HClO_4$ and optionally a thickening agent such as polyvinyl alcohol. This suspension is then put into contact with the support to deposit a layer which is subsequently dried and heated until the boehmite is transformed into alumina and until the alumina particles are sintered into a layer constituting a porous body of alumina which is strongly bonded to the support.

Throughout the following, the thermal stability of these layers is discussed. Thermal stability is a property of porous structures in which crystal or grain size, specific surface area and pore size evolve to a small extent only when these structures are heated to high temperatures.

When the above-defined layers are used at high temperatures, their pore size is not sufficiently stable. This is due to the fact that porous bodies are inherently metastable: any mobility of atoms or groups of atoms tends to lower surface energy by lowering specific surface area.

In practice, this tendency causes grain growth which increases pore size and sometimes decreases pore fraction per unit volume. This effect is mentioned in U.S. Pat. Nos. 4,711,719 and 4,562,021 which describe how the pore size of the final layer can be increased by simply increasing its sintering temperature. If the mobility of atoms or groups of atoms at a given temperature is sufficient to cause grain growth and the associated increase in pore diameter to occur during the sintering operation which generally only lasts a few hours, then the pore size stability of the layer cannot be maintained during practical use of the membrane over periods of several thousand hours unless the temperature of use is considerably lower than the sintering temperature. This means that the temperature of use is limited to too low a value for many applications.

The problem of insufficient thermal stability occurs mainly in membranes having pores that are very small in diameter, i.e. diameters smaller than 50 nm. For example, an alumina membrane sintered at 1,400° C., with a pore diameter of 1 $\mu$m, may be maintained at 800° C. for a very long time without any noticeable change in the diameter of its pores. For membranes with small pores, i.e. with small grains of oxide, the main source of mobility of the atoms is free surface diffusion and grain boundary diffusion.

A similar problem is encountered in catalysts or catalyst supports made of gamma-alumina and having a large specific surface area. When these catalysts are used for long periods at high temperature, their specific surface area decreases, their grain diameter increases, and the gamma-alumina is converted to alpha-alumina. This decreases the surface area available for catalysis or for lodging a finely dispersed catalyst. The efficiency of the catalyst is thus reduced.

Proposals have already been made to impregnate such gamma-alumina catalyst supports with a solution of a salt of an oxide other than $Al_2O_3$. This impregnation is followed by drying and calcination. The end result is the formation of another oxide in the pores of the catalyst support or on their surfaces. It is observed that the thermal stability of the catalyst is increased when zirconium, calcium, lanthanum, or thorium salts are used, but is decreased when indium or gallium salts are used.

If such a process is applied to the separating layer of a membrane, the following drawbacks are observed:

the impregnation brings the impregnation oxide onto the free surface of the grains forming the layer, but does not bring it into the grain boundaries, and therefore has no effect on atom mobility in grain boundaries; and in addition to the impregnation proper, the impregnation process involves a drying operation and a baking operation, and is therefore costly.

An object of the present invention is to provide a porous inorganic composite semipermeable membrane which is crack-free, and stable at high temperatures.

SUMMARY OF THE INVENTION

The present invention provides a porous inorganic composite semipermeable membrane provided with a support and a separating layer which has pores with an average diameter less than 1 $\mu$m and which comprises at least two refractory metal oxides, wherein:

said seperating layer is composed of grains of a first oxide phase and grains of at least one second oxide which is dispersed over and chemically bonded to the first oxide phase, so as to constitute at least a portion of the free surface of the grains of said first oxide phase and at least a portion of the grain boundaries between the grains of said first oxide phase;

said first oxide phase and said second oxide are chosen so that the second oxide slows down diffusion both at the surface and at the grain boundary of the first oxide phase and has low solubility in said first oxide phase; and the volume of said second oxide lies in the range of 0.1% to 25% of the volume of said first oxide phase.

Such a separating layer has greater thermal stability than a similar separating layer comprising only grains of said first oxide phase.

Advantageously, said first oxide phase is chosen from $Al_2O_3$, $TiO_2$, $ZrO_2$, $HfO_2$, and a mixed oxide containing at least one of the preceding oxides.

Said second oxide is chosen from $ZrO_2$, $HfO_2$, $La_2O_3$, $ThO_2$, $CaO$, and a mixed oxide containing at least one of the preceding oxides.

The second oxide may be dispersed in various ways on the free surface of said first oxide phase and in the grain boundaries thereof. Although observing such a state of dispersion is almost impossible in practice, the degree of surface coverage may be defined in terms of the equivalent thickness of the second oxide.

The degree of surface coverage of the grains of the first oxide phase preferably corresponds to less than a single monolayer of atoms of the metal of the second oxide with their associated oxygen atoms. This fraction of a monolayer is present on the free surface of the first oxide phase and at the boundaries thereof. The degree of coverage is called the SCI (Surface Coverage Index). It is equal to 1 for a monolayer and less than 1 for a fraction of a monolayer.

The higher thermal stability of membranes in accordance with the invention is due to the presence of the second oxide which slows down both free surface and grain boundary diffusion of the first metal oxide. The second oxide also slows down both the grain growth of the first metal oxide and the pore size increase in the separating layer caused by this grain growth. However, the separating layer is still a thermodynamically unstable system and if it is heated to a sufficiently high temperature, the second metal oxide rearrange into crystals and the grains of the first metal oxide grow. The thermal stability of a membrane of the invention is therefore limited to a temperature range below temperatures at which diffusion is fast enough to cause the atoms of the second oxide to rearrange into crystals.

Since the second oxide is chosen so that it has low solubility in the first oxide phase, the quantity of second oxide overlying the decreasing specific surface area of the first oxide phase remains constant. The surface concentration (expressed by SCI) of the second oxide thus increases, and with this increase, the relative efficiency of the second oxide in slowing down diffusion also increases.

The present invention also provides a method of making the separating layer of the preceding membrane, said method comprising the following steps:
  preparing a stable sol of particles of said first oxide phase, or of the corresponding hydroxide;
  adding to this sol at least one compound of at least one metal capable of forming said second oxide, said compound being capable of being mixed homogeneously with the liquid phase of said sol to obtain a slip;
  putting the microporous inorganic support into contact with said slip to deposit said separating layer; and
  drying this layer and heating it to a temperature such that said hydroxide is converted to oxide (if hydroxide is being used), and so that said first oxide phase and said second oxide are sintered together to form a microporous structure in which said second oxide is dispersed both on the free surface of the grains of the first oxide phase and in the grain boundaries thereof.

The requirement that the second metal compound added to the sol must be capable of being mixed homogeneously with the liquid phase of said sol means that either:
  the compound dissolves in said liquid phase and remains in a dissolved state; or
  the compound dissolves and then precipitates onto the surface of the colloidal particles of the sol; or
  the compound reacts with one of the constituents of the sol, the reaction product then precipitating onto the surface of the colloidal particles of the sol.

In all cases in which precipitation is produced, this precipitation only begins after a certain time which must be long enough for the added compound to mix homogeneously with the sol.

If the second oxide is a mixed oxide, it may be formed by one of two methods.

The first method is to react the first oxide with the oxide derived from the metal which was added to the sol as a compound. For example, if a lanthanum compound is added to the liquid phase of the slip, although the oxide $La_2O_3$ is not stable in the presence of $Al_2O_3$ at high temperature, the binary oxide $La_2O_3 \cdot 11Al_2O_3$ is stable under these conditions and constitutes said second oxide.

The second method is to form this mixed oxide from a plurality of soluble compounds of various metals added to the sol.

BRIEF DESCRIPTION OF THE DRAWINGS

Embodiments of the invention are described by way of example with reference to the accompanying drawings, in which the figures are very diagrammatic views of greatly enlarged sections showing the various ways in which the second oxide of a metal $M_2$ is dispersed both on the free surface and in the grain boundaries of the first oxide phase of a metal $M_1$.

In all these figures, analogous components are designated by the same references.

DETAILED DESCRIPTION

Figure 1A:
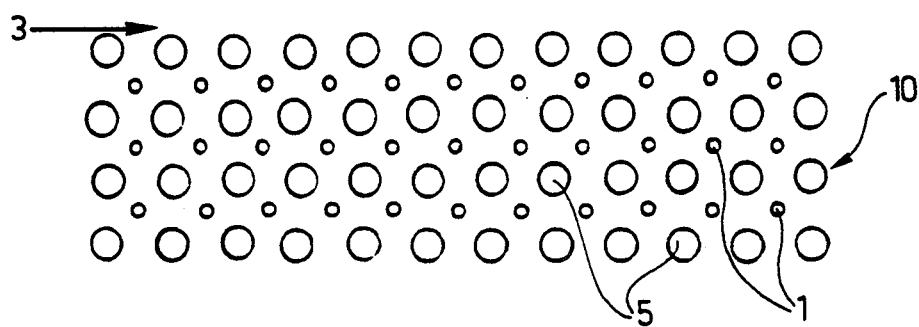
FIG. 1A shows a grain of the oxide of metal $M_1$ with the free surface of the grain being apparent (prior art).

FIG. 1A shows a grain 10 in an oxide of the first metal $M_1$ with metal atoms 1 and oxygen atoms 5. The free surface of the grain 10 is referenced 3.

Figure 1B:
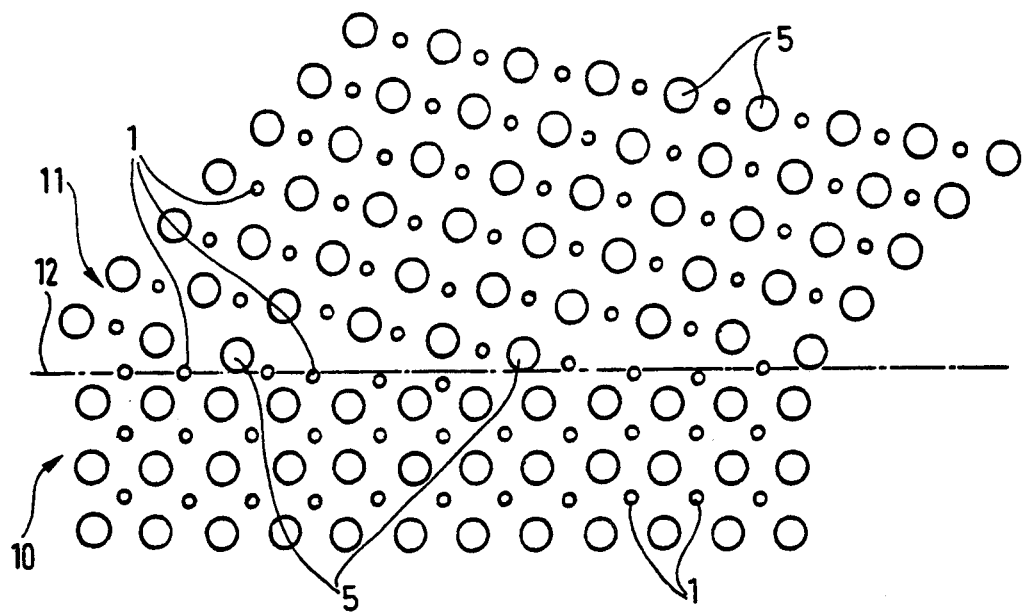
FIG. 1B shows two grains of the oxide of metal $M_1$ with the grain boundary between the two grains being apparent (prior art).

FIG. 1B shows the same grain 10 bonded to a grain 11 of the same type, showing their mutual grain boundary 12.

Figure 2A:
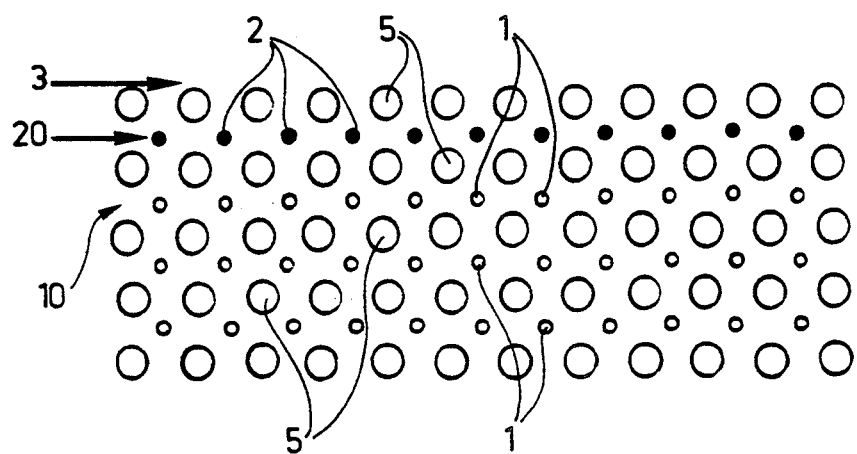
FIG. 2A shows a grain of the oxide of metal $M_1$ with the free surface of the grain being covered by a monolayer of the oxide of metal $M_2$ in accordance with the invention.
Figure 2B:
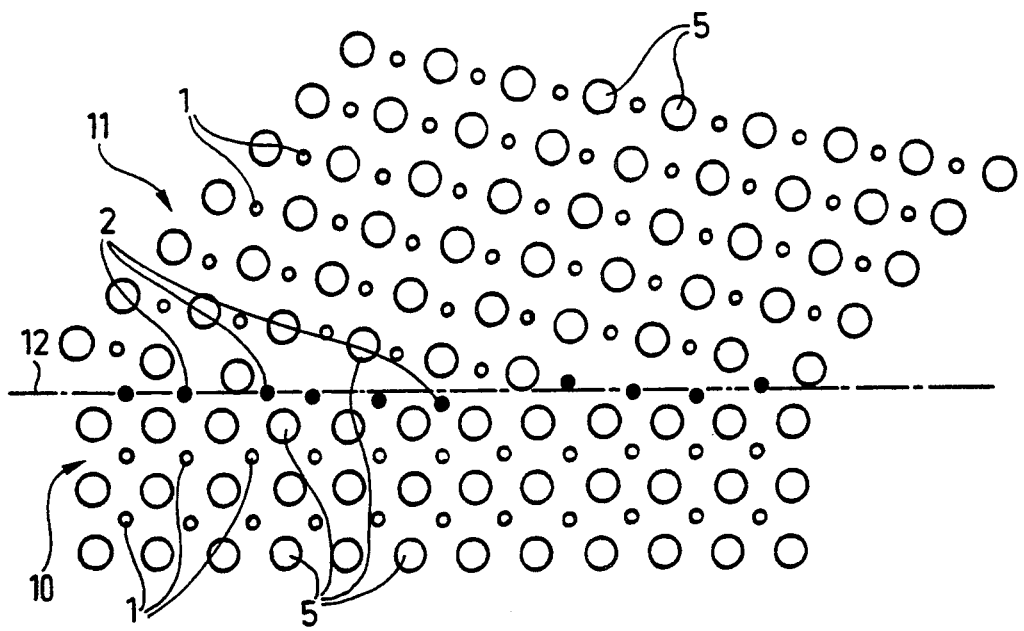
FIG. 2B shows two grains of the oxide of metal $M_1$ with a monolayer of the oxide of metal $M_2$ at the grain boundary between the two grains in accordance with the invention.

In FIG. 2A, the grain surface is covered, in accordance with the invention, by a monolayer 20 of the oxide of the second metal $M_2$, whose atoms are referenced 2. In FIG. 2B, the grain boundary 12 includes a monolayer of the oxide of the second metal $M_2$. The above-defined SCI is equal to 1 in the case of FIGS. 2A and 2B.

Figure 3A:
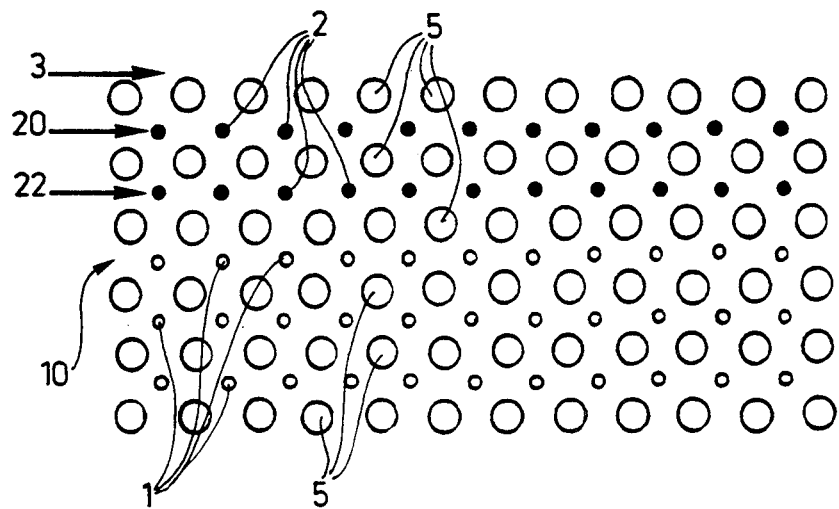
FIGS. 3A and 3B are analogous to FIGS. 2A and 2B, but they each show two monolayers of the oxide of metal $M_2$.
Figure 3B:
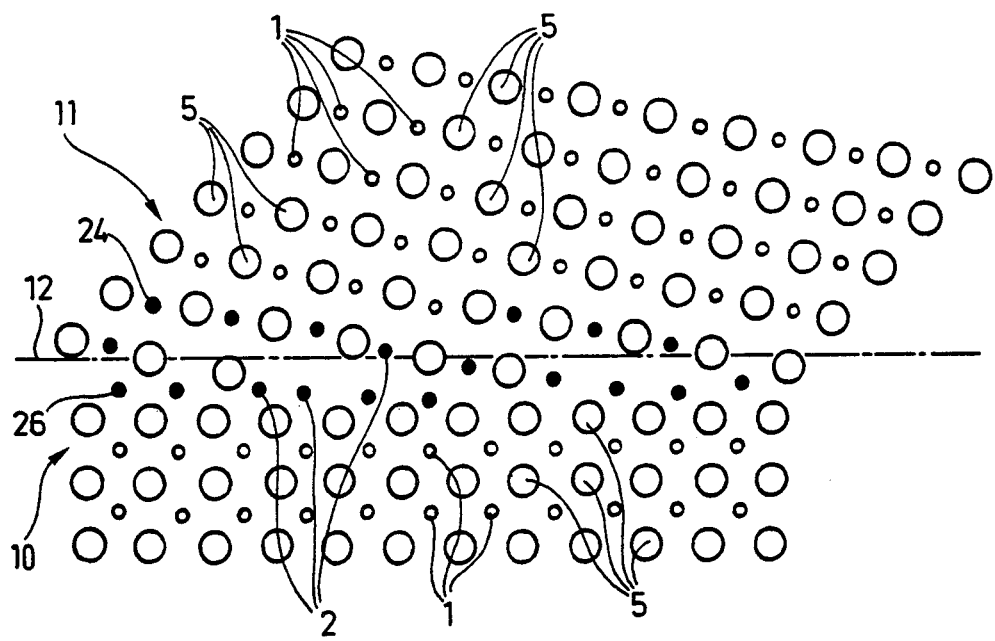

In FIG. 3A, the oxide of the second metal $M_2$ is in the form of two monolayers 20 and 22 on the free surface of the grain 10, and in FIG. 3B, it is in the form of two monolayers 24 and 26 at the grain boundary 12. In both cases, the SCI is greater than 1.

Figure 4A:
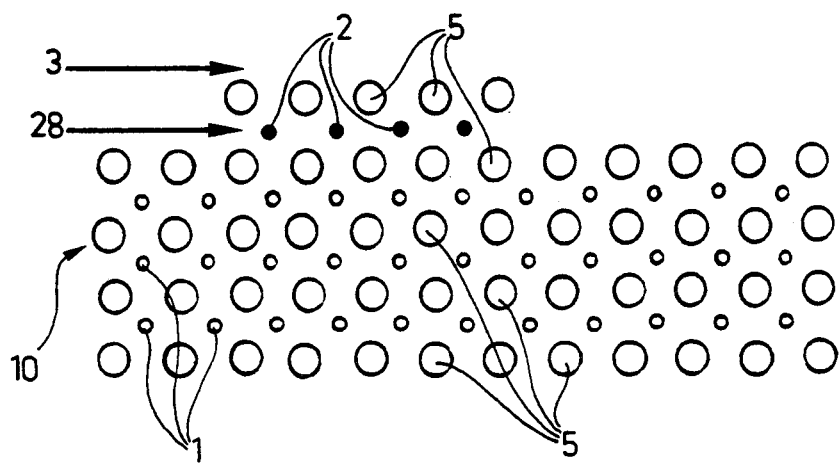
FIG. 4A is analogous to FIG. 2A, but the free surface of the grain of the oxide of metal $M_1$ is only partially covered by a monolayer of the oxide of metal $M_2$.
Figure 4B:
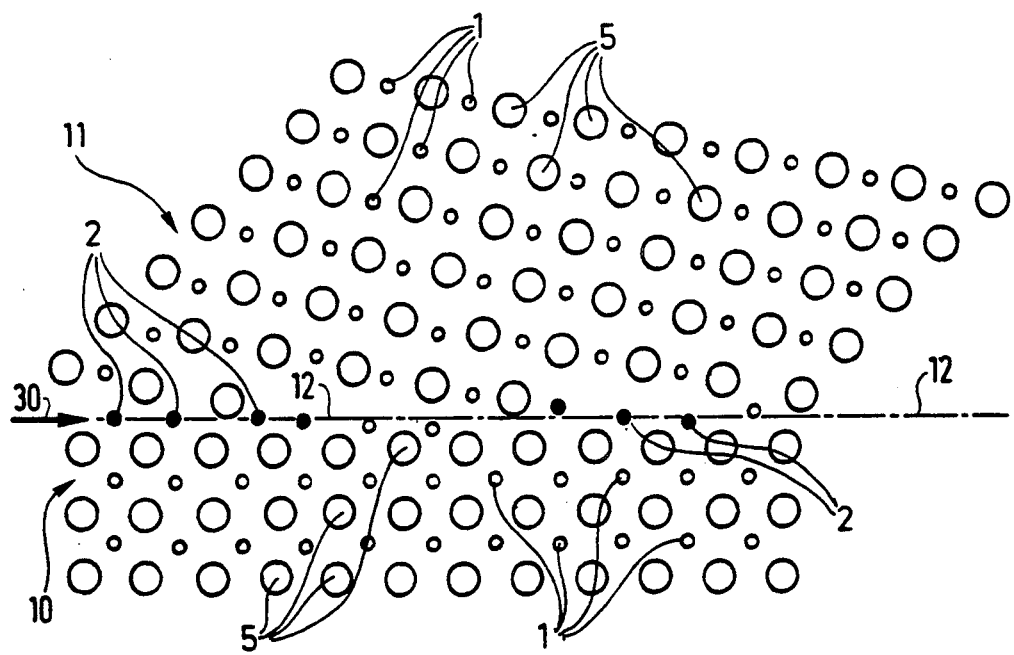
FIG. 4B is analogous to FIG. 2B, but the grain boundary only includes a fraction of a monolayer of the oxide of metal $M_2$.

In FIGS. 4A and 4B, the oxide of the metal $M_2$ is only present in the form of a fraction of a monolayer, such as monolayers 28 and 30. In both cases, the SCI is less than 1.

Figure 5A:
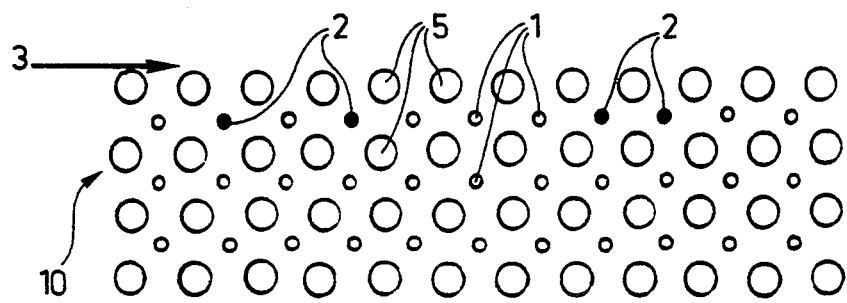
FIGS. 5A and 5B are analogous to FIGS. 4A and 4B, but with only a few dispersed atoms of the metal $M_2$.
Figure 5B:
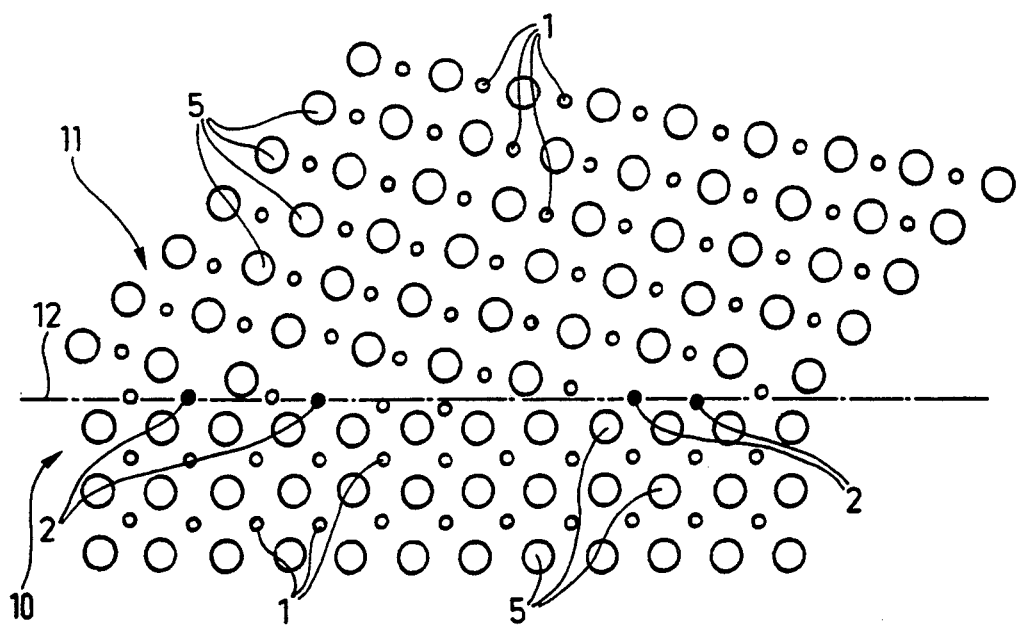

In FIGS. 5A and 5B, atoms 2 of metal $M_2$ are dispersed respectively over the free surface of the grain 10 and at the grain boundary 12. Here too, the SCI is less than 1.

Six examples are given below.

EXAMPLE I

A boehmite sol is prepared, the liquid phase of which contains a zirconium compound in solution.

For this, 1 mole of aluminum tri-sec-butoxide is mixed with two liters of water at 85° C. to precipitate boehmite. After evaporating the butanol formed, 0.08 moles of $ZrOCl_2 \cdot 8H_2O$ are added and the sol is placed under reflux for 3 days.

A layer of this slip is then deposited on the inside surface of a porous tubular aluminum support. This support has an outside layer which is 2 mm thick with a pore diameter of 10 μm, and an inside layer which is 50 μm thick with a pore diameter of 0.2 μm. To deposit this layer, the tube is filled with the slip and emptied after a contact time of 5 seconds. The layer deposited on the inside surface of the tube is then dried at 40° C. and slowly heated (30° C./hour) to various temperatures lying in the range of 600° C. to 900° C., the final temperature being maintained for 3 hours. The layer is then cooled.

The layer formed on the inside of the tube is 3 microns thick and is crack-free. Its pore size may be measured by the $N_2$ absorption method, using the slit-shaped pore model described by Leenaars in U.S. Pat. No. 4,711,719 and in the publication: "The preparation and characterization of alumina membranes with ultra-fine pores", Journal of Materials Science, vol. 19 (1984), pp. 1077-1088.

The thermal stability of this layer of invention is compared to a similar layer of the prior art prepared in an analogous manner, except that $ZrOCl_2 \cdot 8H_2O$ is not added.

Pore size (in nanometers) is measured before and after heat treatment for 3 hours at 600° C., and heat treatment for 3 hours at 900° C.

The results and the SCI are given in Table I.

TABLE I

|  | 600° C.-3 hr | 900° C.-3 hr |
|---|---|---|
| Layer of the invention | 2.6 nm<br>SCI ≦ 0.45 | 3 nm<br>SCI ≦ 0.5 |
| prior art layer | 2.6 nm | 5 nm |

It can be seen that the layer in accordance with the invention shows much better stability than the layer corresponding to prior art. In this example, the presence of the second oxide almost completely blocks the growth in pore size in the range 600° C. to 900° C.

The order of magnitude of the SCI given in Table I is estimated in the following manner:
- the layer is composed of elongated platelets of gamma alumina whose thickness e is approximately equal to the size of the slit-shaped pores; this is demonstrated by Leenaars in the article: "The preparation and characterization of alumina membranes with ultra-fine pores", Journal of Materials Science, vol. 19 (1984), pages 1077-1088;
- in a zirconia crystal, the thickness of a sheet of zirconium atoms with their associated oxygen atoms is approximately 0.3 nm;
- the volume fraction V of zirconia (relative to the volume of alumina) required to cover both faces of an ideal platelet of alumina, of thickness e with a monolayer of zirconium atoms and the associated oxygen atoms is therefore:

$$V = 2 \times \frac{0.3}{e} \text{ (with } e \text{ expressed in nanometers).}$$

Given the specific masses of crystalline zirconia ($\approx 6$ g/cm$^3$) and of gamma alumina ($\approx 3.2$ g/cm$^3$), and their molar masses (123.2 for $ZrO_2$ and 102 for $Al_2O_3$ or 51 for $AlO_{1.5}$), the ratio of the molar concentration of zirconium [Zr] to that of aluminum [Al] in the slip can be easily converted to an SCI such that:

$$SCI = \frac{[Zr]}{[Al]} \times \frac{123.2}{51} \times \frac{3.2}{6} \times \frac{e}{2 \times 0.3} = 2.15 \frac{[Zr]}{[Al]} \times e$$

This estimate is made on the assumption that during the steps of layer deposition and drying, the $M_2$ metal compound present in the slip does not migrate into the sublayer or the support.

Since that is not quite true, the real SCI value is less than or equal to the value derived from the preceding calculation.

After being heat treated at various temperatures, the layers of the invention are examined under an electron microscope. $ZrO_2$ particles 10 nm in size are visible in the layers heat treated at 1,000° C., whereas no $ZrO_2$ particles are visible in the layers heat treated at 600° C., 700° C., 800° C. and 900° C., although $ZrO_2$ is present in these layers.

This would indicate that, for heat-treatment temperatures in the range of 600° C. to 900° C., the zirconia present in the layer is so well dispersed that it cannot be seen by electron microscopy, whereas, at 1,000° C., diffusion is sufficient for at least part of the zirconia to rearrange into observable particles.

EXAMPLE II

A layer of the invention is prepared following the same procedure as in Example I, except that the 0.08 moles of $ZrOCl_2 \cdot 8H_2O$ are replaced by 0.08 moles of $ZrO(NO_3)_2$. After the layer has been deposited, dried and heat treated, the same pore size results are obtained as in Example I: 2.6 nm after 3 hours at 600° C., and 3 nm after 3 hours at 900° C. The estimated SCI of the layer heat treated at 600° C. is not greater than 0.45.

EXAMPLE III

A layer of the invention is prepared following the same procedure as in Example I, except the zirconium oxychloride is replaced by hafnium oxychloride. After depositing, drying and heat treating the layer, pore size results analogous to Example I are obtained: 2.7 nm after 3 hours at 600° C., and 3.1 nm after 3 hours at 900° C. The estimated SCI of the layer heat treated at 600° C. is not greater than 0.45.

EXAMPLE IV

A layer of the invention is prepared following the same procedure as in Example I, except that the 0.08 moles of zirconium oxychloride are replaced by 0.04 moles of zirconium oxychloride and 0.04 moles of hafnium oxychloride. After depositing, drying and heat treating the layer, the same pore size results are obtained as in Example I. The estimated SCI of the layer heat treated at 600° C. is not greater than 0.45.

EXAMPLE V

A layer of the invention is prepared following the same procedure as in Example I, except that the 0.08 moles of zirconium oxychloride are replaced by 0.03 moles of lanthanum nitrate $La(NO_3)_3$.

The layer is dried and heat treated at various temperatures. Its pore size is compared to the pore size of a layer made without lanthanum nitrate being added. The results obtained are given in Table II.

TABLE II

| Heat treatment | Pore size (nm) | |
| --- | --- | --- |
| | Prior art | With $La(NO_3)_3$ |
| 600° C.-15 hrs | 3 | 3 |
| 1,000° C.-30 hrs | 8 | 6 |
| 1,100° C.-30 hrs | 90 | 11 |
| 1,200° C.-30 hrs | 120 | 24 |

As can be seen from the table, the presence of lanthanum nitrate markedly increases the thermal stability of the layer.

In this case, the SCI (based on $La_2O_3$) can be estimated as being not greater than 0.3 after heat treatment at 600° C.

At higher temperatures, the heat-treatment causes a substantial increase in pore size ($\times 8$) with a substantial decrease in specific surface area. This decrease produces a substantial increase in the SCI since a constant quantity of the oxide $La_2O_3$ (which is insoluble in alumina) covers a decreasing surface area.

In this example, the presence of $La_2O_3$ slows down grain growth and pore size growth, even in a temperature range in which this grain growth is very active.

EXAMPLE VI

Layers of the invention are prepared following the same procedure as in Example I, except that the zirconium oxychloride is replaced by lanthanum nitrate or calcium nitrate.

The following results are obtained:

| ADDITIVE | OVERALL MOLAR RATIO IN THE SLIP | HEAT TREATMENT | PORE SIZE*** (nm) | ESTIMATED SCI |
| --- | --- | --- | --- | --- |
| NONE | | 600° C.-15 hrs | 3.2 | — |
| NONE | | 900° C.-15 hrs | 5.2 | — |
| $Zr(NO_3)_4$ | Zr/Al = 0.0124 | 900° C.-15 hrs | 3.3 | ≦0.08 |
| $La(NO_3)_3$ | La/Al = 0.009 | 900° C.-15 hrs | 4.3 | ≦0.07* |
| $Ca(NO_3)_2$ | Ca/Al = 0.027 | 900° C.-15 hrs | 4.9 | ≦0.17** |

*based on $La_2O_3$.
**based on CaO.
***calculated using the slit-shaped pore model.

This example shows that the efficiency of the method of the invention depends on the nature of the oxide chosen.

Membranes in accordance with the invention may be used for high-temperature applications, and in particular:

- filtering gases at high temperature to extract solid or liquid particles;
- separating gases at high temperature by the Knudsen diffusion process or an analogous process; and
- catalytic reactions coupled with a separating membrane in catalytic membrane reactors.

Membranes in accordance with the invention may also be used for filtering liquids or gases and for separating gases at low temperature.

We claim:

1. A porous inorganic composite semipermeable membrane provided with a support and a separating layer which has pores with an average diameter less than 1 μm and which comprises at least two refractory metal oxides, wherein:
   said separating layer is composed of grains of a first oxide phase and grains of at least one second oxide which is dispersed over and chemically bonded to the first oxide phase, so as to constitute at least a portion of the free surface of the grains of said first oxide phase and at least a portion of the grain boundaries between the grains of said first oxide phase;
   said first oxide phase and said second oxide are chosen so that the second oxide slows down diffusion both at the surface and at the grain boundary of the first oxide phase and has low solubility in said first oxide phase; and
   the volume of said second oxide lies in the range of 0.1% to 25% of the volume of said first oxide phase.

2. A composite membrane according to claim 1, wherein said first oxide phase is chosen from $Al_2O_3$, $TiO_2$, $ZrO_2$, $HfO_2$ and a mixed oxide containing at least one of the preceding oxides.

3. a composite membrane according to claim 1, wherein said second oxide is chosen from $ZrO_2$, $HfO_2$, $La_2O_3$, $ThO_2$, CaO and a mixed oxide containing at least one of the preceding oxides, and the composition of the second oxide is different from the composition of the first oxide phase.

4. A composite membrane according to claim 1, wherein the degree of coverage at the free surface of the grains and at the grain boundaries of said first oxide phase by said second oxide corresponds to at least one monolayer of atoms of the metal of the second oxide with their associated oxygen atoms.

5. A method of preparing the separating layer of a porous inorganic composite semipermeable membrane according to claim 1, wherein method comprises the following steps:
   preparing a stable sol of particles of said first oxide phase;
   adding to this sol at least one compound of at least one metal capable of forming said second oxide, this compound being capable of being mixed homogeneously with the liquid phase of said sol to obtain a slip;
   putting the microporous inorganic support into contact with said slip to deposit said separating layer; and
   drying this layer and heating it to a temperature such that said first oxide phase and said second oxide are sintered together to form a microporous structure in which said second oxide is dispersed both on the free surface of the grains of the first oxide phase and in the grain boundaries thereof.

6. A method of preparing the separating layer of a porous inorganic composite semipermeable membrane according to claim 1, wherein the method comprises the following steps:

preparing a stable sol of hydroxide particles corresponding to said first oxide phase;

adding to this sol at least one compound of at least one metal capable of forming said second oxide, this compound being capable of being mixed homogeneously with the liquid phase of said sol to obtain a slip;

putting the microporous inorganic support into contact with said slip to deposit said separating layer; and drying this layer and heating it to a temperature such that said hydroxide is converted to oxide, and such that said first oxide phase and said second oxide are sintered together to form a microporous structure in which said second oxide is dispersed both on the free surface of the grains of the first oxide phase and in the grain boundaries thereof.

* * * * *